United States Patent
Robinson

(10) Patent No.: US 12,255,764 B2
(45) Date of Patent: Mar. 18, 2025

(54) METHODS AND APPARATUS FOR CORRECTING TIMING AND FREQUENCY OFFSETS BETWEEN COMMUNICATIONS RECEIVERS AND TRANSMITTERS

(71) Applicant: Rampart Communications, Inc., Annapolis, MD (US)

(72) Inventor: Matthew Brandon Robinson, Crownsville, MD (US)

(73) Assignee: Rampart Communications, Inc., Annapolis, MD (US)

( * ) Notice: Subject to any disclaimer, the term of this patent is extended or adjusted under 35 U.S.C. 154(b) by 125 days.

(21) Appl. No.: 18/077,645

(22) Filed: Dec. 8, 2022

(65) Prior Publication Data
US 2023/0188403 A1 Jun. 15, 2023

Related U.S. Application Data

(60) Provisional application No. 63/288,335, filed on Dec. 10, 2021.

(51) Int. Cl.
*H04L 27/26* (2006.01)
*H04B 7/0456* (2017.01)

(52) U.S. Cl.
CPC ....... *H04L 27/2672* (2013.01); *H04B 7/0456* (2013.01); *H04L 27/2657* (2013.01);
(Continued)

(58) Field of Classification Search
CPC ............. H04L 25/0202; H04L 25/0204; H04L 27/2655; H04L 27/2657; H04L 27/2659;
(Continued)

(56) References Cited

U.S. PATENT DOCUMENTS 7,778,338 B2 * 8/2010 Ma ..................... H04L 27/2657
 375/350
10,951,442 B2 3/2021 Robinson
(Continued)

FOREIGN PATENT DOCUMENTS

WO WO-2006053340 A2 5/2006

OTHER PUBLICATIONS

International Search Report and Written Opinion for International Application No. PCT/US2022/081173 dated Mar. 31, 2023, 15 pages.
(Continued)

*Primary Examiner* — Betsy Deppe

(57) ABSTRACT

A processor-implemented method includes receiving a signal representing a first encoded data and calculating an estimated timing offset and/or an estimated frequency offset associated with the signal. A correction of at least one of a timing offset or a frequency offset of the signal is performed based on the estimated timing offset and/or the estimated frequency offset, to produce a modified signal. An effective channel is subsequently detected based on the signal or the modified signal. A second encoded data is generated based on the modified signal, a known vector, at least one left singular vector of the effective channel, and at least one right singular vector of the effective channel. A signal representing the second encoded data is transmitted to a communication device for identification of contents of a message at a different processor.

19 Claims, 4 Drawing Sheets

(52) U.S. Cl.
CPC ........ *H04L 27/266* (2013.01); *H04L 27/2662* (2013.01); *H04L 27/2671* (2013.01)

(58) Field of Classification Search
CPC ............... H04L 27/266; H04L 27/2662; H04L 27/2663; H04L 27/2665; H04B 7/0456
See application file for complete search history.

(56) References Cited

U.S. PATENT DOCUMENTS

| | | | |
|---|---|---|---|
| 11,159,220 B2 | 10/2021 | Robinson | |
| 2017/0063590 A1* | 3/2017 | Dhananjay | .......... H04L 27/2662 |

OTHER PUBLICATIONS

Jin, J., et al., "Inter-cell antenna calibration for TDD CoMP systems", 2014 XXXIth URSI General Assembly and Scientific Symposium (URSI GASS), IEEE (Aug. 16, 2014); pp. 1-4.

Kaltenberger, F., et al., "Relative channel reciprocity calibration in MIMO/TDD systems", Future Network & MobileSummit 2010 Conference Proceedings, IEEE (Jun. 16, 2010); pp. 1-10.

Uher, J., et al., "Effect of sample timing on LS channel estimation", 2009 3rd International Conference on Signal Processing and Communication Systems (Sep. 28, 2009); pp. 1-5.

Zou, Y., et al., "Efficient Estimation and Compensation of Transceiver Non-Reciprocity in Precoded TDD Multi-User MIMO—OF'DM Systems", 2014 IEEE 80th Vehicular Technology Conference (VTC2014-Fall). IEEE (Sep. 14, 2014); pp. 1-7.

* cited by examiner

METHODS AND APPARATUS FOR CORRECTING TIMING AND FREQUENCY OFFSETS BETWEEN COMMUNICATIONS RECEIVERS AND TRANSMITTERS

CROSS-REFERENCE TO RELATED APPLICATIONS

This application claims priority to and the benefit of U.S. Provisional Patent Application No. 63/288,335, filed Dec. 10, 2021 and titled "METHODS AND APPARATUS FOR CORRECTING TIMING AND FREQUENCY OFFSETS BETWEEN COMMUNICATIONS RECEIVERS AND TRANSMITTERS," the contents of which are incorporated by reference herein in their entirety.

This application is related to U.S. Pat. No. 10,951,442, issued Mar. 16, 2021 and titled "Communication System and Method Using Unitary Braid Divisional Multiplexing (UBDM) with Physical Layer Security," and to U.S. Pat. No. 11,159,220, issued Oct. 26, 2021 and titled "Single Input Single Output (SISO) Physical Layer Key Exchange," the disclosures of which are incorporated by reference herein in their entireties.

FIELD

The present disclosure relates to signal processing for communication systems, and more specifically, to measuring various properties of a signal, to measuring and correcting various types of offset, including timing and frequency offsets.

BACKGROUND

In wireless communications, the physical layer exchange of information can be accomplished using single input single output (SISO) and multiple-input and multiple-output (MIMO) systems and methods.

SUMMARY

In some embodiments, a processor-implemented method for remediating signal distortion includes receiving a signal representing a first encoded data and calculating an estimated timing offset associated with the signal and/or an estimated frequency offset associated with the signal. A correction of at least one of a timing offset or a frequency offset of the signal is performed based on the estimated timing offset and/or the estimated frequency offset, to produce a modified signal. An effective channel is subsequently detected based on the signal or the modified signal. A second encoded data is generated based on the modified signal, a known vector, at least one left singular vector of the effective channel, and at least one right singular vector of the effective channel. A signal representing the second encoded data is transmitted to a communication device for identification of contents of a message at a different processor.

In some embodiments, a method for correcting signal distortion includes receiving the signal at a first processor, the signal representing an encoded data and a channel transformation. At least one of an estimated timing offset or an estimated frequency offset associated with the signal is identified via the first processor, and a correction of at least one of a timing offset of the signal or a frequency offset of the signal is performed by the first processor based on the at least one of the estimated timing offset or the estimated frequency offset associated with the signal, to produce a modified signal. After the identifying and the performing, a representation of an effective channel is detected via the first processor, based on one of the signal or the modified signal. A singular value decomposition of the representation of the effective channel is performed to identify right singular vectors thereof, and a codebook of unitary matrices is queried to identify contents of a message associated with the modified signal based on the right singular vectors and a unitary matrix.

In some embodiments, a signal distortion remediation method includes receiving, at a first processor, a signal representing (1) a first symbol of a first encoded data, and (2) a channel transformation. The first processor calculates at least one of an estimated timing offset associated with the signal or an estimated frequency offset associated with the signal, and performs a correction of at least one of a timing offset of the signal or a frequency offset of the signal based on the at least one of the estimated timing offset associated with the signal or the estimated frequency offset associated with the signal, to produce a modified signal. After the calculating and the performing, the first processor detects a representation of an effective channel based on the signal, and a singular value decomposition of the representation of the effective channel is performed to identify a left singular vector of the representation of the effective channel and a right singular vector of the representation of the effective channel. A precoding matrix associated with an index for a message for transmission is selected from a codebook of unitary matrices, and a second encoded data is generated based on a known vector, the modified signal, the precoding matrix, a complex conjugate of the left singular vector, and the right singular vector of the representation of the effective channel. Each of (1) a signal representing a first symbol of the second encoded data and (2) a signal representing a second symbol of the second encoded data, is transmitted through a communication channel, to a communication device for identification of contents of the message at a processor associated with the communication device.

DETAILED DESCRIPTION

Figure 1:
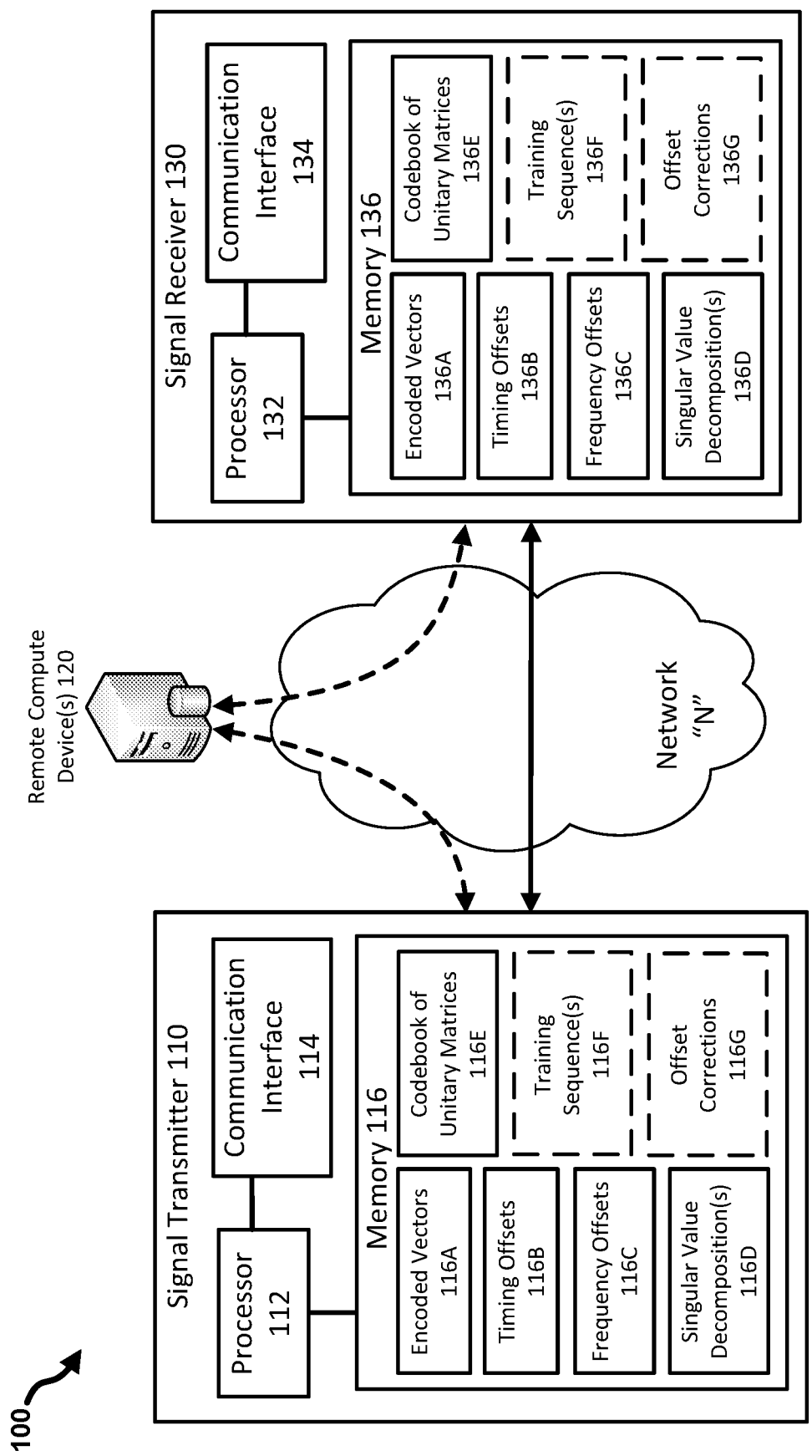
FIG. 1 is a diagram of a system for remediating signal distortion by correcting timing and frequency offsets, according to an embodiment.

In wireless communications (including single input single output (SISO) and multiple-input and multiple-output (MIMO) communications), transmitted signals can undergo time offsets and frequency offsets during transmission between the transmitter and receiver. Time offsets and frequency offsets are considered signal distortions, and the mitigation of such signal distortions is desirable for proper demodulation of the signal.

Time offsets can manifest themselves as follows: rather than receiving a proper/intended sample of a continuous signal f(t), a receiver receives a signal f(t+Δt), where Δt is a timing offset. In the frequency domain, such a shift in time results in a rotating phase in frequency. In other words, if the Fourier transform of f (t) is F(ω), then the Fourier transform of f(t+Δt) is $e^{-i\omega\Delta t}F(\omega)$ (i.e., there is a rotating phase across the frequency domain). Frequency offsets can have a similar impact on signals, however the rotating phase occurs in the time domain signal. In other words, for a frequency offset of Δω, a time domain signal will become $e^{i\Delta\omega t}f(t)$. It is desirable to estimate and correct for both time offsets and frequency offsets so that a signal can be properly demodulated.

A third type of distortion can result from a multipath channel. As used herein, a "channel" refers to a medium for communication or the passage of information via wireless signal, and is synonymous with "communication channel." In other words, a channel is an environment through which wireless signals are propagated. A multipath channel is a particular type of such channel that includes multiple paths between two nodes. Multipath channel distortion can be modeled as a convolution of multiple different "echoes" of the signal. In other words, instead of receiving a proper/intended time domain signal f(t), a receiver instead receives that signal convolved with the "channel" h(t), so the received signal is:

$$\tilde{f}(t) = \int_{-\infty}^{\infty} f(\tau)h(t-\tau)d\tau$$

With the addition of a cyclic prefix (as is done in some known orthogonal frequency-division multiplexing (OFDM) systems, as well as in non-OFDM systems such as Single Carrier Frequency Domain Equalization (SC-FDE) systems, for example), the linear convolution above becomes a circular convolution, which means that the frequency domain representation of the channel distortion becomes:

$$\tilde{F}(\omega)=H(\omega)F(\omega),$$

where H(ω) is the Fourier transform of h(t).

In the discrete/sampled case, a signal $x_n$ is distorted by the channel $h_n$, such that the received signal is the discrete convolution:

$$\tilde{x}_n = \Sigma_m x_m h_{n-m}.$$

With a cyclic prefix, the foregoing linear convolution becomes a circular convolution, such that the frequency domain samples become:

$$\tilde{x}_n = H_n \cdot X_n.$$

The impact of channel distortion can be modelled as a single complex number multiplied by each frequency domain value of a given signal.

There is a similarity between the impact of a timing offset and the impact of a channel, in that, in the frequency domain, a timing offset causes each value $X_n$ to be multiplied by a complex phase $e^{in\Delta/F_s}$ (where $F_s$ is the sample frequency), and the impact of the channel can be represented as an arbitrary complex number $H_n$, where the value of $H_n$ depends on one or more physical characteristics of the channel.

A timing offset estimation and a channel estimation, each of which can be calculated according to methods set forth herein, can be combined into a single estimation, and each of a timing offset and a channel distortion can be corrected, removed, or adjusted with an equalizer. As used herein, an equalizer is defined as an estimate of the inverse of the channel (e.g., multipath channel) and timing error distortion. By applying the equalizer, the distortion caused by the multipath channel and the timing error can be inverted. One or more pilots may then be used to correct any residual global phase offset in the frequency domain. As used herein, "pilots" can refer to a training sequence (e.g., appearing at the beginning of a frame or a packet) or to individual pilot symbols or samples that are interleaved within data symbols or samples. In other words, pilots are complex samples of blocks of complex samples that are known to a receiver, and that are used for synchronizing and equalization.

In some known MIMO and SISO systems, channel values $H_n$ are included as part of exchanges of information. Examples of such MIMO systems are described, for example, in U.S. Pat. No. 10,951,442, issued Mar. 16, 2021 and titled "Communication System and Method Using Unitary Braid Divisional Multiplexing (UBDM) with Physical Layer Security," and examples of such SISO systems are described, for example, in U.S. Pat. No. 11,159,220, issued Oct. 26, 2021 and titled "Single Input Single Output (SISO) Physical Layer Key Exchange," the entire contents of each of which are incorporated by reference herein for all purposes. Some such MIMO and SISO algorithms rely on channel reciprocity, and thus it can be desirable that the impact of $H_n$ be the same in both directions. Because timing offsets in such MIMO and SISO systems are generally not reciprocal between communicants, however, it is desirable to isolate $H_n$ when computing singular value decompositions, such that $H_n$ is not impacted by the timing offset Δt.

In some embodiments set forth herein, a system for remediating signal distortion is configured to calculate/estimate a timing offset and/or to calculate/estimate a frequency offset between a transmitter and a receiver, and to correct the timing offset and/or frequency offset (e.g., based on the calculations/estimations) before other algorithmic details (discussed below) are performed. The calculation/estimation and correction of the timing offset and/or of the frequency offset can be performed in any of a variety of ways, including but not limited to, combinations of upsampling, downsampling, oversampling, decimation, rational resampling (e.g., in the time domain using a matched filter), interpolators, polyphase filtering, filter-banks, and band-pass filtering, for example one or more selected subsets of a given signal. Timing offsets can be found/calculated using a variety of tools, including but not limited to matched filters, decision directed adaptive estimators, Gardner estimators, zero-crossing estimators, direct correlation detectors, or higher order timing error estimators.

As used herein, decimating refers to the sampling of a collection of samples. For example, decimation by a factor of 10 can refer to retaining/keeping only every tenth sample. The "factor" in decimation can be any integer greater than 1. More generally, a signal can be resampled by any positive rational number by a combination of decimation, upsampling, and filtering.

In general, initial steps of processing a signal can include generating synchronization estimates (e.g., including one or more calculations) for one or both of frequency offsets and timing offsets. For example, in some implementations, a coarse frequency offset estimation, followed by a fine frequency offset estimation, may be performed, and the signal can then be corrected based on both estimations. In one implementation, in an OFDM system, a coarse timing offset can be estimated using a matched filter to align with the signal. The receiver can position the beginning of a fast Fourier transform (FFT) window in the middle of what is determined to be the cyclic prefix, to give it some margin of error for any residual timing error. Then, once the FFT has been performed and the equalizer has been applied (e.g., measured from a training sequence prior to this step), the pilot symbols in the frequency domain representation of the symbol can be used to remove any additional phase offsets on the symbol. With both a coarse and fine frequency offset estimated, and the timing error margin provided by the cyclic prefix, the pilots can then be used (e.g., as a sole means) to track and mitigate any residual frequency or timing error, or any drift in those errors.

In other implementations, only an initial coarse timing offset is calculated/estimated, and subsequently, by using sufficiently long cyclic prefixes and a more dense distribution of pilot symbols across the frequency domain subcarriers, the remaining frequency, time, and channel offsets and distortions can all be (1) measured simultaneously and corrected together, or (2) measured every several symbols, with updates to the mitigations being alternately updated (e.g., according to a predefined schedule). Note that in many known systems, at least a portion of a timing offset is both measured and mitigated as part of the channel equalizer.

In some embodiments, a system for remediating signal distortion is configured to perform a timing offset estimation and/or a frequency offset estimation (one or both of which include one or more calculations) as a separate step from channel estimation, and is performed prior to the channel estimation. For example, in some implementations, a timing offset estimation (and, optionally, a related timing offset correction) can occur without a frequency offset estimation and prior to a channel estimation (with optional related channel correction) step. In other implementations, a frequency offset estimation (and, optionally, a related frequency offset correction thereof) can occur without a timing offset estimation and prior to a channel estimation (with optional related channel correction) step. In still other embodiments, both a frequency offset estimation (optionally with a related frequency offset correction) and a timing offset estimation (optionally with a related timing offset correction) can occur prior to a channel estimation (with optional related channel correction) step. For such implementations, one or both of the timing correction and the frequency correction can be performed, whether sequentially, in parallel, or overlapping in time. In still other implementations, a timing offset estimation is performed first, followed by a frequency offset estimation, followed by a channel estimation (with optional related channel correction) step. An optional frequency offset and/or timing offset (based on their associated estimations) can be performed at any stage of the foregoing implementation that is prior to the channel estimation (whether sequentially, overlapping in time, or in parallel, if both corrections are performed). Such sequencing can facilitate the accurate isolation of the channel value $H_n$ without the impact of the timing offset and/or frequency offset. In some implementations, a training sequence is used to perform both timing offset correction and frequency offset correction.

Turning now to the figures, FIG. 1 is a diagram of a system for remediating signal distortion by correcting timing and frequency offsets, according to an embodiment. As shown in FIG. 1, the system 100 includes a signal transmitter 110 in communication (e.g., via a wired or wireless communications network "N") with a signal receiver 130. Optionally, one or both of the signal transmitter 110 and signal receiver 130 is also in communication (e.g., via a wired or wireless communications network "N") with one or more remote compute devices 120. The signal transmitter 110 includes a processor 112 operably coupled to a communications interface 114 and a memory 116. The memory 116 stores data and/or processor-executable instructions (e.g., to perform any of methods 200 (FIG. 2), 300 (FIG. 3), and 400 (FIG. 4), as discussed below). For example, as shown in FIG. 1, the memory 116 includes encoded vectors 116A (or other encoded data, such as lists of numbers), timing offsets 116B (real and/or estimated), frequency offsets 116C (real and/or estimated), singular value decompositions 116D, a codebook of unitary matrices 116E, optionally one or more training sequences 116F, and optionally one or more offset corrections 116G. Similarly, the signal receiver 130 includes a processor 132 operably coupled to a communications interface 134 and a memory 136. The memory 136 stores data and/or processor-executable instructions (e.g., to perform any of methods 200 (FIG. 2), 300 (FIG. 3), and 400 (FIG. 4), as discussed below). For example, as shown in FIG. 1, the memory 136 includes encoded vectors 136A (or other encoded data, such as lists of numbers), timing offsets 136B (real and/or estimated), frequency offsets 136C (real and/or estimated), singular value decompositions 136D, a codebook of unitary matrices 136E, optionally one or more training sequences 136F, and optionally one or more offset corrections 136G. Alternatively or in addition, in some implementations (not shown), the one or more remote compute devices 120 can include any of the encoded vectors (116A, 136A), timing offsets (116B, 136B), frequency offsets (116C, 136C), singular value decompositions (116D, 136D), one or more codebooks of unitary matrices (116E, 136E), one or more training sequences (116F, 136F), and/or one or more offset corrections (116G, 136G).

Figure 2:
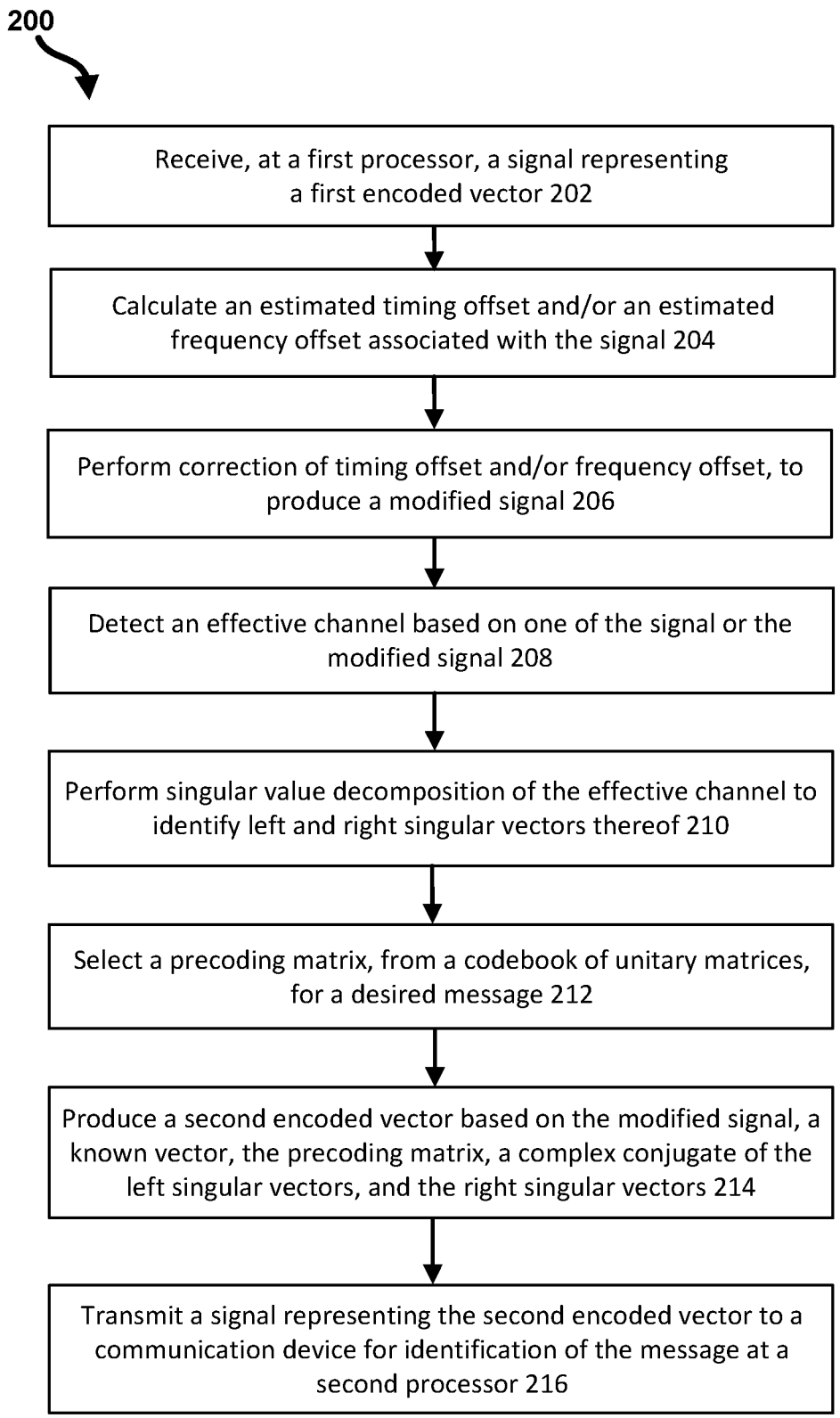
FIG. 2 is a flowchart illustrating a first method for remediating signal distortion by correcting timing and frequency offsets, according to an embodiment.

FIG. 2 is a flowchart illustrating a first method for remediating signal distortion by correcting timing and frequency offsets, according to an embodiment. As shown in FIG. 2, the method 200 (implementable, for example, by the system 100 of FIG. 1) is a method for remediating signal distortion that includes receiving a signal at 202 representing a first encoded vector (or other encoded data, such as a list of numbers), and calculating, at 204, an estimated timing offset and/or an estimated frequency offset associated with the signal. A correction of at least one of a timing offset or a frequency offset of the signal is performed at 206 based on the estimated timing offset and/or the estimated frequency offset, to produce a modified signal. An effective channel is subsequently detected, at 208, based on the signal or the modified signal. At 210, a singular value decomposition of the effective channel is performed to identify left and right singular vectors of the effective channel. A precoding matrix is selected from a codebook of unitary matrices, at 212, for a desired message. At 214, a second encoded vector is generated based on the modified signal, a known vector, at least one left singular vector of the effective channel, and at least one right singular vector of the effective channel. At 216, signal representing the second encoded vector is transmitted to a communication device for identification of contents of a message (e.g., decrypted and/or human readable contents) at a different processor.

In some implementations, at least one of (1) the calculating the at least one of an estimated timing offset or an estimated frequency offset, or (2) the performing the correction, includes performing rational resampling (e.g., using a matched filter) of the signal in the time domain.

In some implementations, at least one of (1) the calculating the at least one of an estimated timing offset or an estimated frequency offset, or (2) the performing the correction, includes oversampling of the signal.

In some implementations, at least one of (1) the calculating the at least one of an estimated timing offset or an estimated frequency offset, or (2) the performing the correction, includes oversampling of the signal and decimating on a subset of the signal.

In some implementations, each of (1) the calculating the at least one of an estimated timing offset or an estimated frequency offset and (2) the performing the correction, is performed based on a training sequence. The training sequence can be a predefined sequence (i.e., a sequence that is known/identifiable by a transmitter and/or a receiver) that is transmitted, and that allows the receiver to directly measure any distortion from that sequence. This facilitates the inference, at the receiver, of timing, frequency and/or channel errors.

In some implementations, the method also includes performing singular value decompositions of the effective channel to identify the at least one left singular vector of the effective channel and the at least one right singular vector of the effective channel.

Figure 3:
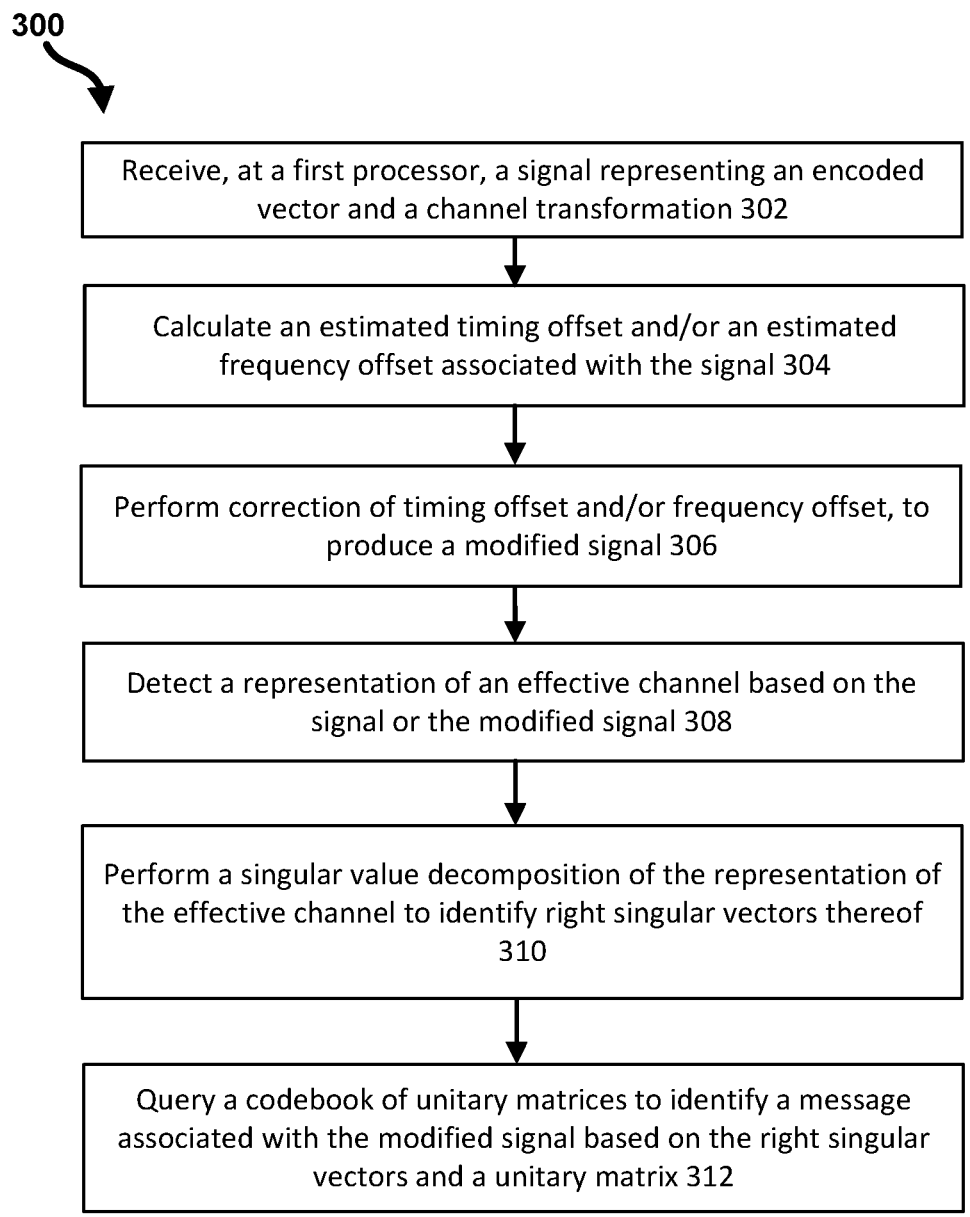
FIG. 3 is a flowchart illustrating a second method for remediating signal distortion by correcting timing and frequency offsets, according to an embodiment.

FIG. 3 is a flowchart illustrating a second method for remediating signal distortion by correcting timing and frequency offsets, according to an embodiment. As shown in FIG. 3, the method 300 (implementable, for example, by the system 100 of FIG. 1), includes receiving the signal at a first processor, at 302. The signal represents an encoded data (e.g., a vector or a list of numbers) and a channel transformation. At least one of an estimated timing offset or an estimated frequency offset associated with the signal is calculated at 304 via the first processor, and a correction of at least one of a timing offset of the signal or a frequency offset of the signal is performed at 306 by the first processor based on the at least one of the estimated timing offset or the estimated frequency offset associated with the signal, to produce a modified signal. After the calculating at 304 and the correction at 306, and at 308, a representation of an effective channel is detected via the first processor, based on one of the signal or the modified signal. A singular value decomposition of the representation of the effective channel is performed at 310 to identify right singular vectors thereof, and a codebook of unitary matrices is queried at 312 to identify contents of a message associated with the modified signal based on the right singular vectors and a unitary matrix.

In some implementations, at least one of (1) the calculating the at least one of an estimated timing offset or an estimated frequency offset, or (2) the performing the correction. includes performing rational resampling (e.g., using a matched filter) of the signal in the time domain.

In some implementations, at least one of (1) the calculating the at least one of an estimated timing offset or an estimated frequency offset, or (2) the performing the correction. includes oversampling of the signal.

In some implementations, at least one of (1) the calculating the at least one of an estimated timing offset or an estimated frequency offset, or (2) the performing the correction. includes oversampling of the signal and decimating on a subset of the signal.

In some implementations, each of (1) the calculating the at least one of an estimated timing offset or an estimated frequency offset and (2) the performing the correction, is performed based on a training sequence.

Figure 4:
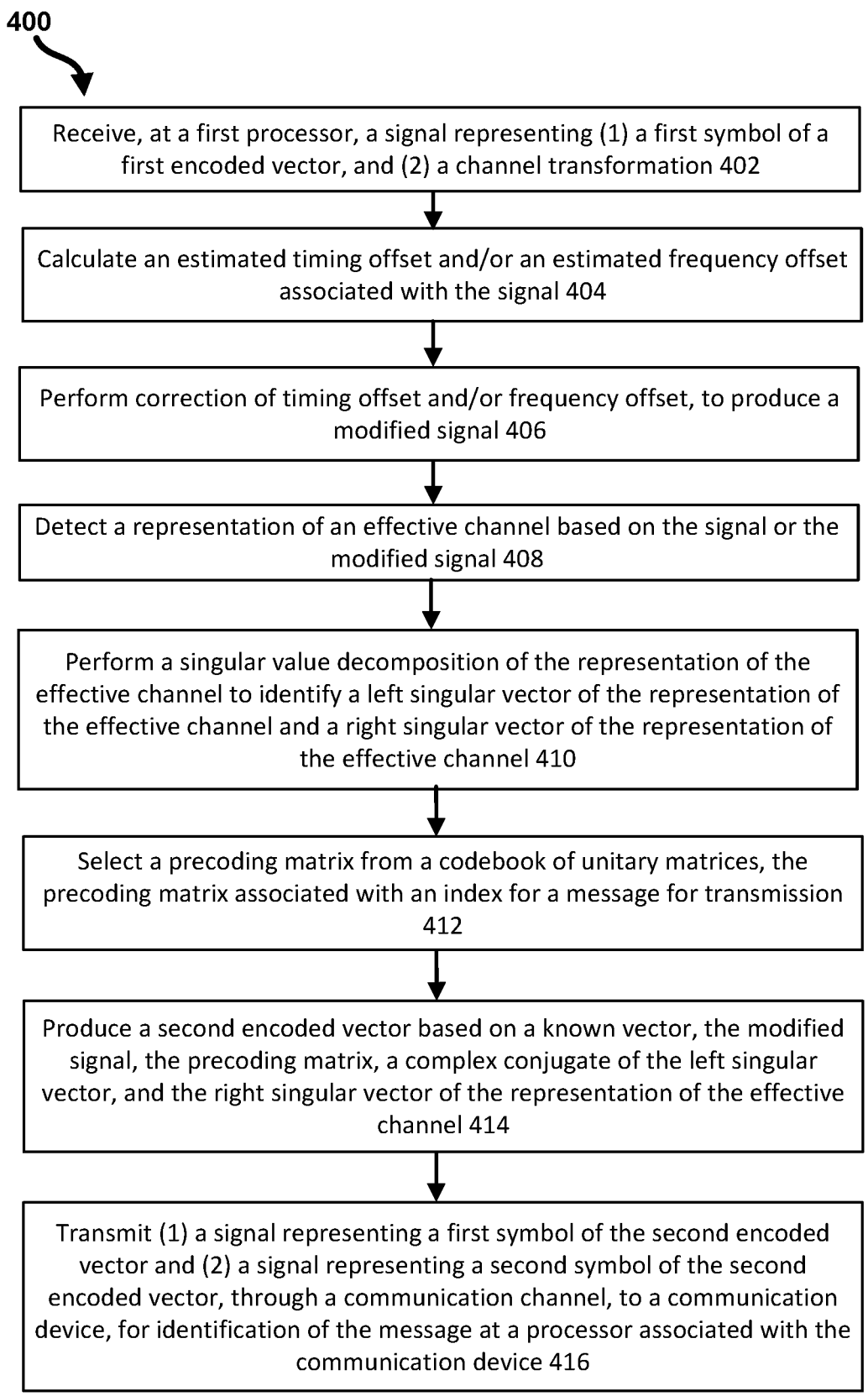
FIG. 4 is a flowchart illustrating a third method for remediating signal distortion by correcting timing and frequency offsets, according to an embodiment.

FIG. 4 is a flowchart illustrating a third method for remediating signal distortion by correcting timing and frequency offsets, according to an embodiment. The method 400 of FIG. 4 can be performed, for example, based on instructions stored in a non-transitory, processor-readable medium, where the instructions cause a processor to perform the steps of method 400. As shown in FIG. 4, the method 400 (implementable, for example, by the system 100 of FIG. 1), includes receiving, at 402, at a first processor, a signal representing (1) a first symbol of a first encoded data (e.g., a vector or a list of numbers), and (2) a channel transformation. The first processor calculates, at 404, at least one of an estimated timing offset or an estimated frequency offset associated with the signal, and performs a correction at 406 of at least one of a timing offset of the signal or a frequency offset of the signal based on the at least one of the estimated timing offset or the estimated frequency offset associated with the signal, to produce a modified signal. After the calculating at 404 and the correction at 406, the first processor detects a representation, at 408, of an effective channel based on the signal, and a singular value decomposition of the representation of the effective channel is performed at 410 to identify a left singular vector of the representation of the effective channel and a right singular vector of the representation of the effective channel. A precoding matrix associated with an index for a message for transmission is selected at 412 from a codebook of unitary matrices, and a second encoded data (e.g., a vector or a list of numbers) is generated at 414 based on a known vector, the modified signal, the precoding matrix, a complex conjugate of the left singular vector, and the right singular vector of the representation of the effective channel. Each of (1) a signal representing a first symbol of the second encoded data and (2) a signal representing a second symbol of the second encoded data, is transmitted through a communication channel (or caused to be transmitted), at 416, to a communication device for identification of contents of the message at a processor associated with the communication device.

In some implementations, at least one of (1) the calculating the at least one of an estimated timing offset or an estimated frequency offset, or (2) the performing the correction, includes performing rational resampling (e.g., using a matched filter) of the signal in the time domain.

In some implementations, at least one of (1) the calculating the at least one of an estimated timing offset or an estimated frequency offset, or (2) the performing the correction, includes oversampling of the signal.

In some implementations, at least one of (1) the calculating the at least one of an estimated timing offset or an estimated frequency offset, or (2) the performing the correction includes oversampling of the signal and decimating on a subset of the signal.

In some implementations, each of (1) the calculating the at least one of an estimated timing offset or an estimated frequency offset and (2) the performing the correction, is performed based on a training sequence.

In some embodiments, a system includes first and second sets of communication devices. A processor coupled to the first set of communication devices produces a first encoded data (e.g., including vector data, a list of numbers, etc.) and transmits the first encoded data to the second set of communication devices via a communication channel that applies distortion(s) (i.e., a channel transformation) to the first encoded data during transmission. A processor coupled to the second set of communication devices receives the transformed signal, detects an effective channel thereof, and identifies left and right singular vectors of the effective channel. As used herein, an "effective channel" can refer to the combination of all modifications made by the transmitter and/or the physical channel. A precoding matrix is selected from a codebook of unitary matrices based on a message, and a second encoded data (e.g., including vector data, a list of numbers, etc.) is produced based on a second known vector, the precoding matrix, a complex conjugate of the left singular vectors, and the right singular vectors. The second encoded data is sent to the first set of communication devices for identification of contents of the message.

In some embodiments, a communication method using unitary braid divisional multiplexing (UBDM) with physical layer security includes receiving, via a first communication device and at a first processor, a signal representing a first encoded data and a channel transformation. The first processor detects a representation of an effective channel based on the received signal, and performs a singular value decomposition of the representation of the effective channel to identify left singular vectors of the representation of the effective channel and right singular vectors of the representation of the effective channel. The first processor selects a precoding matrix from a codebook of unitary matrices, the precoding matrix associated with an index for a message for transmission. The first processor produces a second encoded data based on a second known vector, the precoding matrix, a complex conjugate of the left singular vectors, and the right singular vectors of the representation of the effective channel, and transmits a signal representing the second encoded data, through a communication channel, to a second communication device, for identification of contents of the message at a second processor operably coupled to the second communication device.

In some embodiments, a communication method using UBDM or OFDM with physical layer security includes generating, at a first processor of a first communication device, a first encoded data using a first known vector and a unitary matrix. A first signal representing the first encoded data is transmitted to a second communication device through a communication channel that applies a channel transformation to the first signal during transmission. A second signal representing a second encoded data and the channel transformation is received at the first processor from the second communication device, and the first processor detects a representation of an effective channel based on the second signal. The first processor performs a singular value decomposition of the representation of the effective channel to identify right singular vectors of the representation of the effective channel, and queries a codebook of unitary matrices to identify contents of a message associated with the second signal based on the right singular vectors of the representation of the effective channel and the unitary matrix.

In some embodiments, a communication method using UBDM or OFDM with physical layer security includes applying an arbitrary transformation to a plurality of vectors to produce a plurality of transformed vectors. The arbitrary transformation includes one of a unitary transformation, an equiangular tight frame (ETF) transformation, or a nearly equiangular tight frame (NETF) transformation. Using the arbitrary transformation, a transformed signal is produced based on at least one transformed vector from the plurality of transformed vectors. The transformed signal is transmitted, via a communications channel, to a signal receiver that is configured to detect the transformed signal. A signal representing the arbitrary transformation is provided to the signal receiver, for recovery of the plurality of vectors at the signal receiver based on the arbitrary transformation and one of a location-specific physical characteristic of the communications channel or a device-specific physical characteristic of the communications channel.

In some embodiments, a processor coupled to a first communication device produces and transmits a first encoded data (e.g., including vector data, a list of numbers, etc.) and a second encoded data (e.g., including vector data, a list of numbers, etc.) to a second communication device via a communication channel that applies a channel transformation to the encoded data during transmission. A processor coupled to the second communication device receives the transformed signals, constructs a matrix based on the transformed signals, detects an effective channel thereof, and identifies left and right singular vectors of the effective channel. A precoding matrix is selected from a codebook of unitary matrices based on a message, and a second encoded data (e.g., including vector data, a list of numbers, etc.) is produced based on a second known vector, the precoding matrix, a complex conjugate of the left singular vectors, and the right singular vectors. A first symbol of the second encoded data and a second symbol of the second encoded data are sent to the first communication device for identification of contents of the message.

In some embodiments, a communication method using UBDM or OFDM with physical layer security includes receiving, via a first communication device and at a first processor, a first signal that represents a first symbol of a first encoded data and a channel transformation. The method also includes receiving, via the first communication device and at the first processor, a second signal that represents a second symbol of the first encoded data and a channel transformation. The first processor detects a representation of an effective channel based on the first signal and the second signal. The first processor performs a singular value decomposition of the representation of the effective channel to identify a left singular vector of the representation of the effective channel and a right singular vector of the representation of the effective channel. The first processor selects a precoding matrix from a codebook of unitary matrices, the precoding matrix associated with an index for a message for transmission. The first processor produces a second encoded data based on a second known vector, the precoding matrix, a complex conjugate of the left singular vector, and the right singular vector of the representation of the effective channel. The method also includes transmitting (1) a signal that represents a first symbol of the second encoded data and (2) a signal that represents a second symbol of the second encoded data, through a communication channel, to a second communication device, for identification of contents of the message at a second processor associated with the second communication device.

Implementations of the various techniques described herein may be implemented in digital electronic circuitry, or in computer hardware, firmware, software (executed or stored in hardware), or in combinations of them. Implementations may be implemented as a computer program product, i.e., a computer program tangibly embodied, e.g., in a machine-readable storage device (computer-readable medium, a non-transitory computer-readable storage medium, a tangible computer-readable storage medium, etc.), for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A method, comprising:
receiving, at a first processor, a signal representing a first encoded data;
calculating, via the first processor, at least one of an estimated timing offset associated with the signal or an estimated frequency offset associated with the signal;
performing, via the first processor, a correction of at least one of a timing offset of the signal based on the estimated timing offset or a frequency offset of the signal based on the estimated frequency offset associated with the signal, to produce a modified signal;
detecting, via the first processor and after the calculating and the performing, an effective channel based on one of the signal or the modified signal;
generating, after the calculating and the performing, a second encoded data based on the modified signal, a known vector, at least one left singular vector of the effective channel, and at least one right singular vector of the effective channel; and
transmitting a signal representing the second encoded data to a communication device for identification of contents of a message at a second processor different from the first processor and co-located with the communication device.

2. The method of claim 1, wherein at least one of (1) the calculating the at least one of an estimated timing offset or an estimated frequency offset, or (2) the performing the correction, includes performing rational resampling of the signal in the time domain.

3. The method of claim 2, wherein the rational resampling is performed using a matched filter.

4. The method of claim 1, wherein at least one of (1) the calculating the at least one of the estimated timing offset or the estimated frequency offset, or (2) the performing the correction, includes oversampling of the signal.

5. The method of claim 1, wherein at least one of (1) the calculating the at least one of the estimated timing offset or the estimated frequency offset, or (2) the performing the correction, includes upsampling of the signal and decimating on a subset of the signal.

6. The method of claim 1, wherein each of (1) the calculating the at least one of the estimated timing offset or the estimated frequency offset and (2) the performing the correction, is performed based on a training sequence.

7. The method of claim 1, further comprising performing singular value decompositions of the effective channel to identify the at least one left singular vector of the effective channel and the at least one right singular vector of the effective channel.

8. A method, comprising:
receiving, at a first processor, a signal representing an encoded data and a channel transformation;
identifying, via the first processor, at least one of an estimated timing offset associated with the signal or an estimated frequency offset associated with the signal;
performing, via the first processor, a correction of at least one of a timing offset of the signal based on the estimated timing offset or a frequency offset of the signal based on the estimated frequency offset associated with the signal, to produce a modified signal;
detecting, via the first processor and after the identifying and the performing, a representation of an effective channel based on one of the signal or the modified signal;

performing, after the identifying and the performing, a singular value decomposition of the representation of the effective channel to identify right singular vectors thereof; and querying a codebook of unitary matrices to identify contents of a message associated with the modified signal based on the right singular vectors and a unitary matrix.

9. The method of claim 8, wherein at least one of (1) the identifying the at least one of the estimated timing offset or the estimated frequency offset, or (2) the performing the correction, includes performing rational resampling of the signal in a time domain.

10. The method of claim 9, wherein the rational resampling is performed using a matched filter.

11. The method of claim 8, wherein at least one of (1) the identifying the at least one of the estimated timing offset or the estimated frequency offset, or (2) the performing the correction, includes oversampling of the signal.

12. The method of claim 8, wherein at least one of (1) the identifying the at least one of the estimated timing offset or the estimated frequency offset, or (2) the performing the correction, includes upsampling of the signal and decimating on a subset of the signal.

13. The method of claim 8, wherein each of (1) the identifying the at least one of the estimated timing offset or the estimated frequency offset and (2) the performing the correction, is performed based on a training sequence.

14. A non-transitory, processor-readable medium storing instructions that, when executed by a first processor, cause the first processor to:

receive a signal representing (1) a first symbol of a first encoded data, and (2) a channel transformation;

calculate at least one of an estimated timing offset associated with the signal or an estimated frequency offset associated with the signal;

perform a correction of at least one of a timing offset of the signal based on the estimated timing offset or a frequency offset of the signal based on the estimated frequency offset associated with the signal, to produce a modified signal;

detect, after the calculating and the performing, a representation of an effective channel based on the signal;

perform, after the calculating and the performing, a singular value decomposition of the representation of the effective channel to identify a left singular vector of the representation of the effective channel and a right singular vector of the representation of the effective channel;

select a precoding matrix from a codebook of unitary matrices, the precoding matrix associated with an index for a message for transmission;

generate a second encoded data based on a known vector, the modified signal, the precoding matrix, a complex conjugate of the left singular vector, and the right singular vector of the representation of the effective channel; and cause transmission of (1) a signal representing a first symbol of the second encoded data and (2) a signal representing a second symbol of the second encoded data, through a communication channel, to a communication device for identification of contents of the message at a second processor that is associated with the communication device.

15. The non-transitory, processor-readable medium of claim 14, wherein at least one of (1) the calculating the at least one of the estimated timing offset or the estimated frequency offset, or (2) the performing the correction, includes performing rational resampling of the signal in the time domain.

16. The non-transitory, processor-readable medium of claim 15, wherein the rational resampling is performed using by instructions implementing a matched filter.

17. The non-transitory, processor-readable medium of claim 14, wherein at least one of (1) the calculating the at least one of the estimated timing offset or the estimated frequency offset, or (2) the performing the correction, includes oversampling of the signal.

18. The non-transitory, processor-readable medium of claim 14, wherein at least one of (1) the calculating the at least one of the estimated timing offset or the estimated frequency offset, or (2) the performing the correction, includes upsampling of the signal and decimating on a subset of the signal.

19. The non-transitory, processor-readable medium of claim 14, wherein each of (1) the calculating the at least one of the estimated timing offset or the estimated frequency offset and (2) the performing the correction, is performed based on a training sequence.

* * * * *